United States Patent [19]
DelVecchio

[11] 4,254,968
[45] Mar. 10, 1981

[54] REMOVABLE BALL GUIDE ATTACHMENT FOR TRAILER HITCHES

[76] Inventor: Evo DelVecchio, 2 Worcester St., Clinton, Mass. 01510

[21] Appl. No.: 81,098

[22] Filed: Oct. 2, 1979

[51] Int. Cl.³ .............................................. B60D 1/06
[52] U.S. Cl. ................................ 280/477; 280/478 R; 280/511
[58] Field of Search ............... 280/477, 478 R, 478 B, 280/478 A, 504, 508, 510, 511

[56] References Cited
U.S. PATENT DOCUMENTS

| | | |
|---|---|---|
| 2,472,432 | 6/1949 | McCune et al. ...................... 280/508 |
| 2,890,898 | 6/1959 | Mielke ................................. 280/508 |
| 3,159,917 | 12/1964 | Whitehead ........................... 280/477 |
| 3,434,741 | 3/1969 | Grant, Jr. ............................. 280/511 |
| 3,773,356 | 11/1973 | Eichel et al. ........................ 280/477 |

Primary Examiner—John J. Love
Assistant Examiner—Donn McGiehan
Attorney, Agent, or Firm—Charles R. Fay

[57] ABSTRACT

A removable ball guiding attachment to the tongue of a trailer hitch having two diverging members guiding the ball of the trailer hitch in correct position with respect to the clamp on the tongue of the hitch.

8 Claims, 3 Drawing Figures

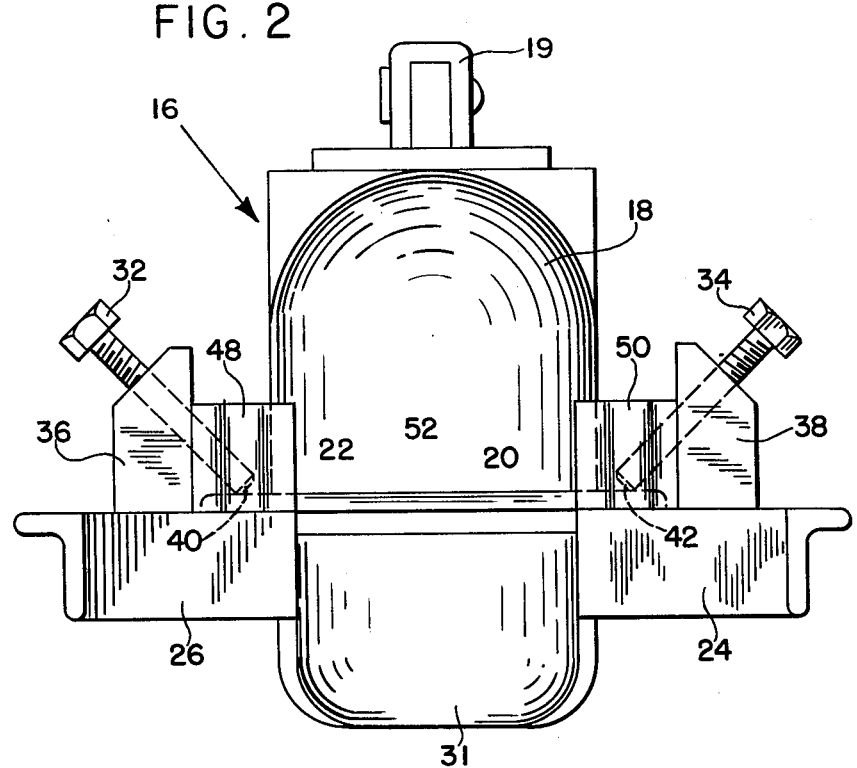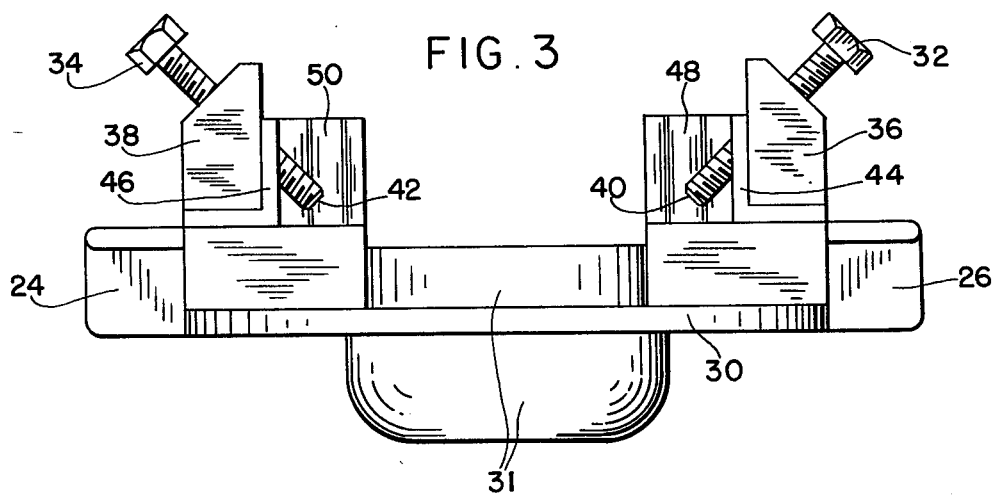

REMOVABLE BALL GUIDE ATTACHMENT FOR TRAILER HITCHES

BACKGROUND OF THE INVENTION

It is often a difficult job to back a vehicle having a ball into correct association with the hanger of the trailer hitch and this normally takes two people, one to give directions and one to drive the vehicle.

There have been proposals for permanently mounted V-shaped ball guides to make it easier for the ball to come into correct position for the hanger lock, but these devices are permanently on the hitch and are expensive and sometimes tend to get in the way of loading, hitching up, etc.

It is the object of the present invention to provide a detachable relatively small ball guide device for temporary attachment to the hanger and having a V-shaped guide for the ball to correctly position the same in alignment with the hanger for the locking action.

SUMMARY OF THE INVENTION

The guiding attachment of the present invention comprises a relatively rugged member having a vertical wall for a back stop for the ball, and projecting diverging elements forming a V-shaped guide for aiding in placing the ball in correct position under the hanger. Hangers are provided with horizontal flanges and means is provided on the attachment for temporarily locking the guiding device onto the trailer tongue flange in correct position, and including means for positioning the same so that the back stop more easily receives the ball and locates it in the correct position for lowering the hanger and actuating the usual hanger clamp. The attachment is quickly and easily detached from the hanger and can be used by as many trailer hitches as are present for the purpose described. Also it takes up very little room and is easily stored.

BRIEF DESCRIPTION OF THE FIGURES

FIG. 2 is a view in elevation looking in the direction of arrow 2 in FIG. 1, the ball being omitted; and FIG. 3 is a rear elevation in view of the ball guide itself looking in the direction of arrow 3 in FIG. 1.

PREFERRED EMBODIMENT OF THE INVENTION

Figure 1:
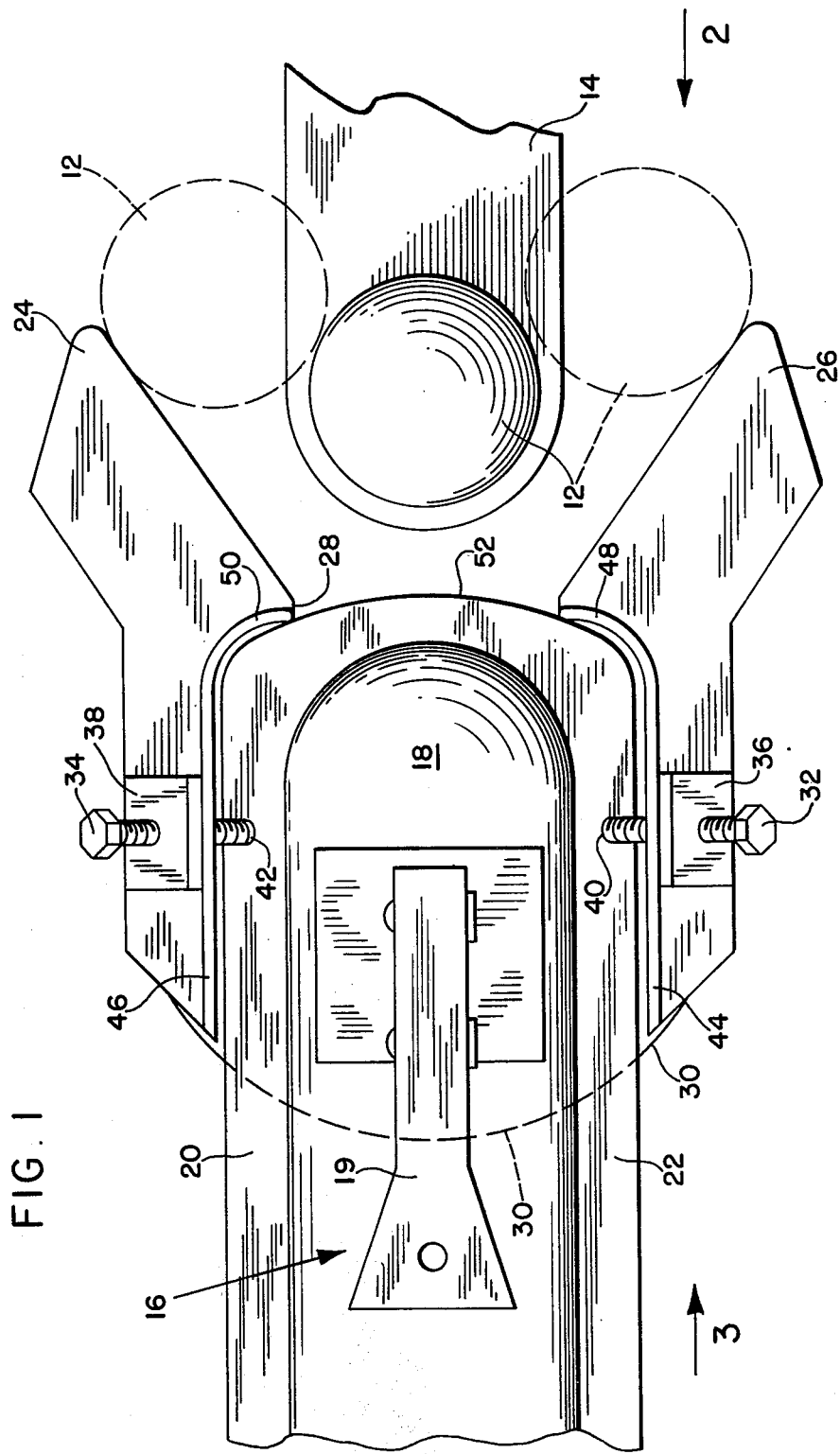
FIG. 1 is a plan view which illustrates the new ball guide attachment.

The ball which is mounted usually at the rear of a powered vehicle is indicated at 12 and it usually has a support such as that at 14 which is connected to the vehicle. The tongue is indicated generally at 16. This tongue is on the trailer and has a dome like member 18 which contains the usual ball clamp not shown but well-known to those skilled in the art. The ball clamp has a lever 19 for actuating it once the ball is correctly located in the dome 18.

Most hangers are also provided with side flanges 20–22 and these are taken advantage of in the present invention providing means for securing the ball guide attachment to the tongue.

The ball guide attachment comprises perferably a single rigid or built up piece which has a pair of guiding members 24, 26 diverging outwardly away from the main body portion of the attachment in order to cause the ball 12 to be moved toward the central opening of the attachment which is indicated at 28.

The members 24 and 26 are mounted on a rugged horizontal member 30 which is provided with a rear vertical wall 31, see FIGS. 2 and 3, that is strong enough to resist any damaging action on the part of the ball if the vehicle is moved too rapidly to its position. The wall 31 is curved and generally fits the ball and acts as a stop to locate the ball under the dome 18.

The ball guide attachment is secured to the flange 20, 22 by any desired means but in this case there is illustrated relatively heavy bolts, 32 and 34 threaded in supports 36 and 38 and having their ends at 40 and 42 bearing on the flanges 20, 22 respectively holding the ball guide in desired position with the edges of the flanges being positioned by upstanding walls 44 and 46. Other suitable adjustable elements may be used as well as threaded bolts. 44 and 46 are directed inwardly at their forward portions as at 48, 50 providing for a stop for the tongue, i.e. flanges 20, 22 and the junction thereof as at 52 locating it in correct position over the opening between the members 24 and 26. This allows the ball 12 to be positioned thereunder.

It will be seen that this relatively simple device is easily attached and detached with respect to the tongue of the trailer hitch and that it helps to guide the ball 12 into the correct location under the dome 18. The ball guide is directly positioned relatively to dome 18 by the inwardly directed portions 48, 50 of side walls 44 and 46, and the rear wall 31 positions ball 12 in the correct location under the clamp in the dome 18. Upon release of the bolts 32, 34, the attachment would be removed downwardly, and it may even fall by gravity.

I claim:

1. A separable attachment for the tongue of a trailer hitch to assist alignment therewith of the ball of the hitch,
    said attachment including means to fix and release the same in desired location on the tongue, and
    a widened access guide member facing out away from the tongue to receive the ball even if out of line with the tongue, the means to fix and release the attachment on the tongue including a fastener to selectively clamp or unclamp the attachment to the tongue.

2. The attachment of claim 1 wherein the means to fix the attachment on the tongue clamps the tongue in one position and releases it in another position, the attachment being removable downwardly from the tongue.

3. The attachment of claim 2 wherein said element having an angled motion relative to the tongue, clamping it in one position and clearing it in another position.

4. The attachment of claim 3 wherein the element is threaded.

5. A separable attachment for the tongue of a trailer hitch to assist alignment therewith of the ball of the hitch,
    said attachment including means to fix and release the same in desired location on the tongue, and
    a widened access guide member facing out away from the tongue to receive the ball even if out of line with the tongue,
    wherein the tongue includes horizontal side flanges and the means to fix and release the attachment to the tongue includes an adjustable element for each flange, said elements each being adjustable on a slant to overlie its respective flange or to clear it.

6. The attachment of claim 5 wherein the elements lines of adjustment are angled relative to each other.

7. The attachment of claim 6 wherein the elements are adjustable longitudinally.

8. The attachment of claim 7 wherein the elements are threaded and are in mesh with threaded supports on the attachment.

* * * * *